United States Patent
Hatchman et al.

(10) Patent No.: US 10,196,556 B2
(45) Date of Patent: Feb. 5, 2019

(54) SURFACTANT COMPOSITION

(71) Applicant: RHODIA OPERATIONS, Paris (FR)

(72) Inventors: Kevan Hatchman, Yorkshire (GB);
Gareth Collins, West Midlands (GB);
Chris Jones, Staffordshire (GB)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 14/402,461

(22) PCT Filed: May 21, 2013

(86) PCT No.: PCT/EP2013/060427
§ 371 (c)(1),
(2) Date: Nov. 20, 2014

(87) PCT Pub. No.: WO2013/174823
PCT Pub. Date: Nov. 28, 2013

(65) Prior Publication Data
US 2015/0126417 A1    May 7, 2015

(30) Foreign Application Priority Data

May 25, 2012 (GB) .................................. 1209268.0

(51) Int. Cl.
*C09K 8/58* (2006.01)
*C09K 8/584* (2006.01)
*C09K 8/94* (2006.01)

(52) U.S. Cl.
CPC ............... *C09K 8/584* (2013.01); *C09K 8/58* (2013.01); *C09K 8/94* (2013.01); *C09K 2208/32* (2013.01)

(58) Field of Classification Search
CPC . C09K 8/58; C09K 8/584; C09K 8/94; C09K 2208/32
USPC .................. 507/209, 267; 166/309, 312, 371
See application file for complete search history.

(56) References Cited

U.S. PATENT DOCUMENTS

| | | |
|---|---|---|
| 5,529,122 A | 6/1996 | Thach |
| 6,627,612 B1 | 9/2003 | O'Lenick, Jr. et al. |
| 6,958,315 B1 | 10/2005 | Anderson et al. |
| 7,008,930 B1 | 3/2006 | O'Lenick, Jr. et al. |
| 7,087,571 B1 | 8/2006 | O'Lenick, Jr. et al. |
| 7,507,399 B1 | 3/2009 | O'Lenick, Jr. |
| 2004/0121917 A1 | 6/2004 | Pakulski |
| 2006/0137879 A1 | 6/2006 | Chan |
| 2007/0181307 A1 | 8/2007 | Yang |
| 2012/0046215 A1 | 2/2012 | Hodge et al. |

FOREIGN PATENT DOCUMENTS

| | | |
|---|---|---|
| GB | 2486241 A | 6/2012 |
| GB | 2506096 A | 3/2014 |
| WO | WO 2011161604 A2 | 12/2011 |
| WO | WO 2013/174816 A1 | 11/2013 |

OTHER PUBLICATIONS

Nguyen, D.T. et al.—"Fundamental Surfactant Properties of Foamers for Increasing Gas Production" (2009) Petroleum Science & Technology, 27, Nos. 7-9 , 743 (18 pages).
Hatchman, K. et al.—"Exploiting Surfactant Synergies in the Development of Foamers for Gas Well Deliquefication" (2011) Proceedings of Chemistry in the Oil Industry XII 83-111 (29 pages).
U.S. Appl. No. 14/402,488, Hatchman et al., WO2013/174816.

*Primary Examiner* — Aiqun Li

(57) ABSTRACT

The invention provides a synergistic surfactant composition comprising: (a) from 5 to 95 wt % of a first surfactant which is selected from derivatives of alkyl polyglucosides and mixtures thereof; and (b) from 5 to 95 wt % of a second surfactant which is selected from: amphoteric surfactants, cationic surfactants, anionic surfactants, non-ionic surfactants, and mixtures thereof. This surfactant composition may be used to generate foam that is used for unloading a liquid from a hydrocarbon reservoir. It may be that the liquid unloading of foam generated using the surfactant composition is greater than that of foam generated from the first and second surfactants when they are foamed individually.

6 Claims, No Drawings

SURFACTANT COMPOSITION

CROSS-REFERENCE TO RELATED APPLICATIONS

The present application is a U.S. national stage entry under 35 U.S.C. § 371 of International Application No. PCT/EP2013/060427 filed May 21, 2013, which claims priority to GB Application No. 1209268.0 filed on May 25, 2012, the whole content of this application being herein incorporated by reference for all purposes.

FIELD OF THE INVENTION

The present invention is concerned with a surfactant composition and, in particular, a synergistic surfactant composition comprising: (a) a first surfactant, which is selected from alkyl polyglucosides, derivatives thereof, and mixtures thereof, and (b) a second surfactant; foams comprising the surfactant compositions; a method of unloading a liquid from a hydrocarbon reservoir; and the use of the surfactant compositions to synergistically enhance liquid unloading.

BACKGROUND TO THE INVENTION

It has been recognized that the productivity of natural gas wells deteriorates over time as a result of a loss in reservoir pressure. The loss in reservoir pressure may lead to flooding as a consequence of the ingress of water and hydrocarbon (condensate) from the surrounding formation.

Symptoms of flooding include a drop in the gas velocity or erratic flow caused by liquid aerosols condensing and accumulating to form 'slugs' of fluid. If the liquid is not removed from the well, the fluid level and hydrostatic pressure will increase over a period of time until it reaches a point where it will effectively block the flow of gas to the surface, and from the reservoir into the well.

Well productivity can be improved or maintained by the implementation of artificial lift programmes. These programmes include mechanical methods such as plunger and hydraulic lift, or chemical treatments, in particular foam assisted lift. Surfactants are an integral component of the chemical formulations used in foam assisted lift to unload fluids. Foam assisted lift is cost effective, as well as offering both environmental and performance benefits. Methods for liquid unloading by foam assisted lift are well known in the art.

Foam assisted lift, as its name infers, uses surfactants to create a 'stable' matrix to trap the accumulated fluid (water and hydrocarbons) within the foam's structure. Once formed the foam may then be removed from the reservoir.

The foam is created by shearing forces present in the liquid and gas bubbles are stabilised by the adsorption of surfactant molecules at the gas/liquid interface. The surfactant stabilises the interface by establishing a barrier to coalescence as a result of repulsive steric and electrostatic head group interactions.

Surfactant adsorption also modifies the properties of the interface, e.g. reducing the surface tension. In so doing, it becomes easier to create new interfacial area and the dispersion of gas bubbles is stabilised by further adsorption of surfactant molecules from the bulk liquid. The bubbles continue to multiply and the liquid is incorporated within the film or lamellae separating the bubbles. Lifting the liquid to the surface is permitted when the density of the liquid falls to a value where the threshold flow for lift is achieved, i.e. the critical velocity (Turner Model). In practice, the well is shut for a period of time after the surfactant composition is injected to allow the gas pressure to build and to lower the density of the trapped fluids.

Surfactant formulations are available in both liquid and solid formats. Surfactants from the main chemistry groups have been used in these formulations and include anionic, cationic, amphoteric and non-ionic amphiphiles.

There is, however, an ongoing need for improved surfactant compositions, particularly surfactant compositions which inhibit corrosion and have a limited environmental impact. The present invention addresses this and other problems with the prior art.

SUMMARY OF THE INVENTION

In a first aspect, the present invention provides a surfactant composition, preferably a synergistic surfactant composition, comprising: (a) a first surfactant, which is selected from alkyl polyglucosides, derivatives thereof, and mixtures thereof; and (b) a second surfactant. Typically, the surfactant composition comprises from about 5 to about 95 wt % of the first surfactant and/or from about 5 to about 95 wt % of the second surfactant.

In a second aspect, the present invention provides foam generated from the composition according to the first aspect.

In a third aspect, the present invention provides the use of foam according to the second aspect of the invention for unloading liquid from a hydrocarbon reservoir.

Also provided, in another aspect, is the use of the surfactant composition according to the first aspect to generate foam that is used for unloading a liquid from a hydrocarbon reservoir.

In a fourth aspect, the present invention provides a method of unloading liquid from a hydrocarbon reservoir, the method comprising: introducing two surfactants into the liquid in order to foam the liquid; and then removing foamed liquid from the reservoir.

In a fifth aspect the invention provides the use of two surfactants in combination to synergistically enhance liquid unloading from a hydrocarbon reservoir. Preferably the first surfactant is selected from alkyl polyglucosides, derivatives thereof, and mixtures thereof. The first surfactant is suitably selected from derivatives of alkyl polyglucosides, and mixtures thereof. It may therefore be a single derivative of an alkyl polyglucosides, or it may be a mixture of two or more derivatives of alkyl polyglucosides.

In the aspects of the invention, the following may apply:

The first surfactant is suitably selected from derivatives of alkyl polyglucosides, and mixtures thereof. It may therefore be that there is just one derivative of an alkyl polyglucoside present as the first surfactant, or it may be that a mixture of two or more derivatives of alkyl polyglucosides is used.

In embodiments of the invention the alkyl polyglucoside or derivative thereof has a molecular weight of greater than about 700 Da. It may have a molecular weight less than or equal to about 3000 Da; however, the molecular weight may also be higher than this. In some embodiments the molecular weight is from 1,000 to 20,000 Da.

Alkyl polyglycoside derivatives have been cited as ingredients to boost soil removal of cleaning detergents, e.g. WO 2011161604A2, US2012046215A1 assigned to Ecolab, and as corrosion inhibitors for oilfield applications in GB1201542.6 and GB10207983.1 assigned to Rhodia Operations.

The second surfactant is suitably selected from anionic, cationic, non-ionic or amphoteric surfactants, and mixtures thereof. Thus the second surfactant may be amphoteric, cationic, anionic, or non-ionic, or may be a mixture of two or more such surfactants. It may be an amphoteric surfactant, or a blend of surfactants that includes one or more amphoteric surfactants, optionally together with one or more other (non amphoteric) surfactants.

It has been identified that it is possible to obtain synergistic performance benefits, such as enhancing foam stability and liquid unloading using said surfactant compositions. In particular, it has been found that it is possible to use combinations of surfactants, in particular derivatives of alkyl polyglucosides (as described for example in U.S. Pat. Nos. 6,627,612, 6,958,315, 7,008,930, and 7,087,571 assigned to Colonial Chemicals Inc, and U.S. Pat. No. 7,507,399 assigned to Surfatech Corp), with an anionic, cationic, non-ionic or amphoteric surfactant.

It has also been found that the formulations are suitable for applications in brines containing high levels of dissolved electrolytes, e.g. 5% w/w or more, or 10% w/w or more, or 20% w/w or more of dissolved electrolytes, such as NaCl $CaCl_2$, $NaHCO_3$, $Na_2CO_3$ and the like. The brine may, in one embodiment, contain from 0 to 30% w/w, or from 0 to 25% w/w, or from 0.5 to 20% w/w, or from 1 to 15% w/w, or from 5 to 10% w/w, of dissolved electrolytes. The formulations can also be used in freshwater.

The second surfactant may be selected from C8-C22 betaines and salts thereof, C8-C22 sultaines and salts thereof, C8-C22 propionates and salts thereof, cationic surfactants, anionic surfactants, non-ionic surfactants and mixtures thereof. Preferably the second surfactant is selected from C8-C22 betaines and salts thereof, C8-C22 sultaines and salts thereof, C8-C22 propionates and salts thereof, and mixtures thereof.

Where reference is made herein to "salts thereof" these may be any suitable salts. In one embodiment the salt is a salt based on a monovalent cation, such as Na, K, or $NH_4$. In one embodiment, the salt is a salt based on an alkali metal, e.g. Na or K. The use of alternative salts, e.g. alkali earth metal salts such as Ca and Mg could also be contemplated; however the solubility of the product would need to be borne in mind when using such salts.

Amphoteric surfactants of interest include C8-C22 sultaines or C8-C22 betaines or C8-C22 propionates, to provide enhanced liquid unloading performance. Non-ionic surfactants of interest include APGs, alkanolamides, alcohol ethoxylates and sucrose esters.

In one embodiment the second surfactant is an amphoteric surfactant. In one embodiment the second surfactant is selected from C8-C22 betaines and salts thereof, C8-C22 sultaines and salts thereof, C8-C22 propionates and salts thereof, and mixtures thereof.

In a further embodiment the second surfactant is a cationic surfactant. In a yet further embodiment the second surfactant is an anionic surfactant. In a yet further embodiment the second surfactant is a non-ionic surfactant. In a yet further embodiment the second surfactant is a mixture of any two or more of the above mentioned surfactants.

Furthermore, low corrosivity formulations may be prepared by the desalination of the compositions, particularly those where sultaine or betaine is present, to remove undesirable by-products, such as sodium chloride, which may cause corrosion problems. Desalinated compositions are desirable for use in formulations which are injected into a well using a capillary string.

Furthermore, the formulations have improved aquatic toxicity and biodegradability compared to other synergistic surfactant compositions.

In preferred embodiments, the surfactant composition comprises less than about 0.5%, or less than to about 0.4% (e.g. from about 0.01 to about 0.4%) by weight NaCl, preferably from about 0.01 to about 0.2% by weight as chloride. Low salt amphoteric surfactants may be produced by any appropriate process, including reverse osmosis.

In one embodiment, the second surfactant is a sultaine that is a low salt sultaine, such as one with less than about 0.5% (e.g. from about 0.01 to about 0.4%) by weight NaCl, preferably from about 0.01 to about 0.2% by weight as chloride.

Amphoteric surfactants have a high tolerance to dissolved electrolytes and pose a lower risk of forming emulsions with hydrocarbons compared to both anionic and non-ionic surfactants. Moreover, it has been found that the emulsification performances of the compositions according to the invention are similar to those of individual amphoteric surfactants.

In embodiments, the surfactant composition is a synergistic surfactant composition. Typically, a synergistic surfactant composition will show at least one, optionally more than one, improved property when compared to both the first surfactant and the second surfactant when tested individually. Typically, a foam generated from the synergistic surfactant composition will show at least one, optionally more than one, improved property when compared to a foam generated from both the first surfactant and the second surfactant when foamed individually.

Preferably, the liquid unloading of foam generated using the surfactant composition is improved compared to that of foam generated from the first surfactant and second surfactant when used individually.

It may be that the flash foam volume of the surfactant composition is greater than the flash foam volume of the first surfactant and second surfactant when foamed individually.

It may be that the foam quality of a foam generated from the surfactant composition is greater than the foam quality of a foam generated from the first surfactant and second surfactant when foamed individually.

It may be that the half-life of a foam generated from the surfactant composition is greater than the half-life of a foam generated from the first surfactant and second surfactant when foamed individually.

Preferably, the combination of the first surfactant and the second surfactant provides a synergistic surfactant composition.

Preferably, therefore, the combination will show at least one, optionally more than one, improved property when compared to the first surfactant and the second surfactant when used individually. The two surfactants may be introduced into the liquid simultaneously (e.g. in the form of a composition according to the first aspect), or sequentially, or separately (e.g. with a gap between their addition of 1 minute or more, such as 5 minutes or more). When added sequentially or separately, the first surfactant may be added first, with the second surfactant being added second, or the second surfactant may be added first, with the first surfactant being added second.

The surfactant compositions, foams and methods according to the invention have been found to be particularly useful in foam assisted lift from oil and gas reservoirs, e.g. oil or gas wells, pipelines or flowlines. The surfactant compositions, foams and methods according to the invention may, for example, be used in relation to gas wells that are suffering a loss of reservoir pressure.

They are also useful in other oil and gas field applications such as well completion; drilling mud removal (chemical wash); or to stimulate production.

The formulations are also suitable for use in the production of natural gas trapped in sensitive formations (e.g. shales). The surfactant compositions, foams and methods according to the invention may also be used in shale or tight gas applications, as underbalanced drilling fluid systems, and to remove water from the well bore after it has been completed. The formulations may also be used in topside applications, such as pipeline deliquification or cleaning.

The surfactant composition may suitably be used in an industrial aqueous system. As noted above, this may be an oil or gas field application. The industrial aqueous system may in another embodiment be an aqueous system in a chemical plant, e.g. a chemical manufacturing, processing or distribution plant. The industrial aqueous system may in another alternative embodiment be a water plant, e.g. an industrial water treatment or distribution system. The industrial aqueous system may in another alternative embodiment be a paper manufacturing plant. In one embodiment, the aqueous fluid is at a temperature of 100° C. or less, such as 90° C. or less, e.g. 80° C. or less, or 70° C. or less, or 60° C. or less.

In one embodiment, the aqueous fluid has a pH that is about neutral, e.g. having a pH of from about 6 to about 8, e.g. from about 6.5 to about 7.5, or from about 7 to about 8.

The invention also relates to the use of the composition of the invention in any one of said applications.

In one embodiment, the invention is used with a gas well. The composition of the invention facilitates the production of production fluid having a significant amount of light hydrocarbon products, especially natural gas condensates. As used herein, the term "light hydrocarbon(s)" is distinguished from "heavy hydrocarbons", which refers to those hydrocarbons that are liquid under ambient temperatures and pressures such as crude oil.

In gas well embodiments, the compositions serve to foam the production fluid, in part to produce it at the surface for sale, but often primarily to move the production fluid out of the way so that it does not impede the flow of natural gas from the oil and gas well.

In another embodiment, the invention is used to increase the production of an oil well. In an oil well, the production fluids often have a substantial proportion of heavy hydrocarbons such as crude oil. The compositions of the invention may be employed with the use of an injected gas such as nitrogen or carbon dioxide. In this and similar embodiments, the composition of the invention serves to foam the production fluid to unload the heavy hydrocarbons, which are the products of greatest interest in an oil well. By foaming the heavy hydrocarbons, the heavy hydrocarbons are reduced in viscosity and thus more easily brought to the surface. The invention may also be useful in removing an excess of brine that may be acting as an impediment to hydrocarbon flow from the reservoir and to the surface.

In the practice of the invention, the surfactants are injected or otherwise introduced into a production fluid. It may be that the surfactants are provided together, in the form of a composition, or they may be provided separately. Ideally, the production fluid is then agitated in the presence of a gas. Often, the gas itself is the source of the agitation. Sometimes, the gas and the agitation are due to the energetic production of natural gas from the oil and gas reservoir. In some embodiments, the gas, the agitation and even both the gas and agitation are introduced downhole by the well operator.

In another embodiment, the invention is used in relation to gas/oil pipelines or flow lines. The ascending and descending of a the pipeline or flowline creates "valleys" that allow for, in the case of natural gas, an accumulation of any fluid, the composition may be used to foam and thereby unload the liquid from the valley to allow for the unimpeded flow of gas. Even in a pipeline or flow line transporting crude oil, the accumulation of production fluids that are primarily brine may be an impediment to the flow of production fluid that is primarily crude oil. In such cases the invention may also be used to foam and thereby sweep the production fluid out of the way to allow for improved flow of the production fluid that is primarily crude oil.

In an embodiment of the invention, the surfactant composition further comprises one or more additives selected from the group consisting of solvents, demulsifiers, biocides, dispersants, scale inhibitors, chelants, scavengers, corrosion inhibitors, co-surfactants, and combinations thereof.

In some embodiments, the total weight of the first surfactant and the second surfactant consists of from about 10% to about 80% by weight of the first surfactant; such as from about 20% to about 60% by weight of the first surfactant; e.g. from 20% to 40% by weight of the first surfactant.

Typically, the ratio of the first surfactant to the second surfactant by weight is from about 5:1 to about 1:5, preferably from about 4:1 to about 1:4; such as from about 3:1 to about 1:3; or from about 3:2 to about 2:3; or from about 2:1 to about 1:2; e.g. 1:1.

DETAILED DESCRIPTION OF THE INVENTION

The present invention provides a surfactant composition comprising: (a) preferably from about 5% to about 95% by weight, e.g. from about 10% to about 90% by weight, or from about 20% to about 80% by weight, or from 20% to 40% by weight, of a first surfactant, which is selected from alkyl polyglucosides, derivatives thereof, and mixtures thereof; and (b) preferably from about 5% to about 95% by weight, e.g. from about 10% to about 90% by weight, or from about 20% to about 80% by weight, or from 60% to 80% by weight, of a second surfactant.

The first surfactant is preferably selected from derivatives of alkyl polyglucosides, and mixtures thereof. The second surfactant is preferably selected from C8-C22 betaines and salts thereof, C8-C22 sultaines and salts thereof, C8-C22 propionates and salts thereof, cationic surfactants, anionic surfactants and non-ionic surfactants, and mixtures thereof.

It may be that the surfactant composition comprises: (a) from about 5% to about 90% by weight, e.g. from about 10% to about 80% by weight, or from about 15% to about 70% by weight, or from 20% to 60% by weight, of a first surfactant, which is selected from derivatives of alkyl polyglucosides, and mixtures thereof; and (b) from about 5% to about 90% by weight, e.g. from about 10% to about 80% by weight, or from about 15% to about 70% by weight, or from 20% to 60% by weight, of a second surfactant, which is selected from C8-C22 betaines and salts thereof, C8-C22 sultaines and salts thereof, C8-C22 propionates and salts thereof, cationic surfactants, anionic surfactants and non-ionic surfactants, and mixtures thereof.

It may be that the ratio of the first surfactant to the second surfactant, by weight, is from about 10:1 to about 1:10, preferably from about 8:1 to about 1:8; more preferably from about 5:1 to about 1:5. In one preferred embodiment, the ratio of the first surfactant to the second surfactant, by weight, is from about 4:1 to about 1:4, such as from about 3:1 to about 1:3, or from about 2:1 to about 1:2; or from about 3:2 to about 2:3; e.g. about 1:1.

In one embodiment, the ratio of the first surfactant to the second surfactant, by weight, is from about 4:1 to about 1:4, such as from about 4:1 to about 1:3, or from about 4:1 to about 1:2; or from about 4:1 to about 2:3; or from about 3:1 to about 1:2; or from about 3:1 to about 2:3; or from about 3:2 to about 2:3; e.g. about 1:1.

It may be that the surfactant composition comprises a combined amount of first surfactant plus second surfactant that is in the range of from about 10% to about 90% by weight of the total composition, e.g. from about 15% to about 85% by weight, or from about 20% to about 80% by weight, or from 25% to 70% by weight, or from 30% to 65% by weight, or from 35% to 60% by weight.

It may be that the surfactant composition comprises a combined amount of first surfactant plus second surfactant that is in the range of from about 15% to about 95% by weight of the total composition, or from about 15% to about 90%, or from about 20% to about 90%, or from about 25% to about 85%, by weight, or from 25% to 75% by weight.

It may be that the combined amount of first surfactant plus second surfactant makes up 60% or more by weight of the total amount of surfactant used (in the composition, method or use of the invention), such as 70% or more, or 80% or more, or 90% or more, or 95% or more, or 96% or more, or 98% or more. It may be that the combined amount of first surfactant plus second surfactant makes up from 75% to 100% by weight of the total amount of surfactant used (in the composition, method or use of the invention), or from 80% to 99%, or from 85% to 98%, or from 90 to 97%, or from 90 to 95%, by weight.

The surfactant composition is preferably a synergistic surfactant composition. Typically, a synergistic surfactant composition will show at least one, optionally more than one, improved property when compared to both the first surfactant and the second surfactant when tested individually. Typically, a foam generated from the synergistic surfactant composition will show at least one, optionally more than one, improved property when compared to a foam generated from both the first surfactant and the second surfactant when foamed individually.

It may suitably be that the liquid unloading of foam generated using the surfactant composition is improved compared to that of foam generated from the first and second surfactant when used individually.

Liquid unloading potentials of the foamer systems are calculated, as described in D T Nguyen, Petroleum Science & Technology, 2009, 27, 743 'Exploiting Surfactant Synergies in the Development of Foamers for Gas Well Deliquefication', K Hatchman, C Jones, B Downward, G Collins, A Fellows, Proceedings of Chemistry In The Oil Industry XII, Royal Society of Chemistry (2011), using the following expression:

$$\text{Liquid unloading (\%)} = \frac{\text{Weight of fluid recovered}}{\text{Total weight of fluid(brine + hydrocarbon)}} \times 100$$

It may be that the flash foam volume of the surfactant composition is greater than the flash foam volume of the first and second surfactant when foamed individually. The flash volume of a surfactant composition is the initial volume of a foam generated from the composition.

Typically, the flash foam volume is measured by taking a surfactant composition and making a 10% by weight active aqueous stock solution using deionised water, diluting the stock solution in a 10% w/w aqueous sodium chloride solution, subjecting the mixture to high shear for a predetermined length of time (e.g. 30 seconds) at ambient temperature (20° C.) and then transferring the foam immediately to a measuring cylinder. Typically, the concentration of the surfactant in the brine is 1000 ppm.

It may be that the foam quality of a foam generated from the surfactant composition is greater than the foam quality of a foam generated from the first and second surfactant when foamed individually.

Foam quality (as described in U.S. Pat. No. 7,618,926 B1) is given by:

$$\text{Foam quality (\%)} = \frac{(V_f - V_l)}{V_f} \times 100$$

where $V_f$ is the flash foam volume and $V_l$ is the solution volume (e.g. 200 ml). A high foam quality value indicates that the foam texture is dense, which, in turn, relates to the packing of surfactant molecules at the gas/liquid interface. The better the packing, the more the foam will persist. Lower values indicate that the foam structure is less able to retard liquid drainage and therefore the foam is not as stable.

It may be that the half-life of a foam generated from the surfactant composition is greater than the half-life of a foam generated from the first and second surfactants when foamed individually. The half-life of the foam is defined as the time taken for half the original fluid volume to drain from the foam (e.g. 100 ml). An increase in the half-life corresponds to a reduction in the liquid drainage rate and reflects the texture of the foam. Denser foams, as a rule, tend to take longer to drain and therefore are more persistent.

Alkyl polyglucosides (APGs) are surfactants known for use in the personal care industry, e.g. for hair and skin cleaning and conditioning products. APGs are synthesised from the reaction of glucose and a fatty alcohol. APGs are polymeric in nature and can contain one or more glucoside units.

APGs are usually provided as a mixture of products that differ in terms of the extent of polymerisation. Therefore when referring to the degree of polymerisation (dp) for APGs this will be given as the average (mean) degree of polymerisation of the mixture. For example, a 50:50 mixture of an APG with a dp=1 and an APG with a dp=2 will provide an average degree of polymerisation of 1.5.

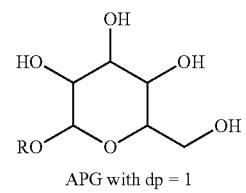

APG with dp = 1

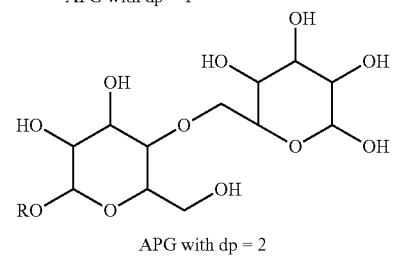

APG with dp = 2

An APG can be reacted with a functionalising agent to create a functionalised polymer. A cross-linking agent will usually be used in such a reaction to create a 'cross-polymer'.

Functional groups that can be added include quaternary compounds (including quaternary ammonium groups), phosphates, carboxymethylates, maleates, sulfonates (including hydroxyalkylsulfonates), succinates and sulfosuccinates. The synthesis of these functionalised APGs is described in U.S. Pat. Nos. 6,627,612 and 7,507,399. Sulfate groups and hydroxy groups can also be mentioned as functional groups that can be added.

Alkyl polyglucosides and derivatives thereof can be tailored to have a molecular weight of greater than 700 Da, which means that they are classified as non bio-accumulating (according to the OSPAR Guidelines for Completing the Harmonised Offshore Chemical Notification Format (HOCNF) (Reference number: 2008-5), paragraph 38).

In particular, derivatives of alkyl polyglucosides can be prepared having molecular weights of the order of about 2000 to about 6000 Da and therefore these do not bio-accumulate in the environment.

Additionally, the surfactant compositions of the invention are beneficial in that they are at least partially biodegradable. It may also be that they can be cleaved by hydrolysis by acids or by bases.

The surfactant compositions of the present invention exhibit low aquatic toxicity. Information regarding the toxicity of surfactants can be found in Chapter 9, Anionic surfactants, Ed: H W Stache, Surfactant Science Series, Vol: 56, Marcel Dekker (1996).

Therefore the surfactant compositions provide a number of advantages over those known in the art.

The total number of carbon atoms in the (or each) alkyl polyglucoside or derivatives thereof may be from about 12 to about 500, such as from about 13 to about 450, or from about 14 to about 400, or from about 15 to about 350. It may be from about 12 to about 300, or from about 16 to about 250, or from about 18 to about 200. Preferably it is from about 20 to about 300, such as from about 22 to about 250, or from about 24 to about 200.

In one embodiment, the alkyl polyglucoside or derivative thereof has a molecular weight ($M_w$) of greater than about 700 Da. (Weight average molecular weight can be determined by HPLC. An example of a suitable HPLC method is given in 'Determination of average molecular weight of commercial surfactants: Alkylpolyglucosides and fatty alcohol ethoxylates' V. Bravo Rodriguez, E. Jurado Alameda, A. Reyes Requena, A. I. Garcia López, R. Bailón-Moreno, M. Cuevas Aranda, J Surfactant Detergents, 2005, 8(5), 341-346.) This molecular weight of greater than about 700 Da can be beneficial for some applications, as it means they would be classified as non bio-accumulating. However, in an alternative embodiment, the surfactant has a molecular weight of about 700 Da or less.

It may be that the alkyl polyglucoside or derivative thereof has a molecular weight of from about 700 to about 20,000 Da, such as from about 1,000 to about 20,000 Da, or from about 1,000 to about 15,000 Da, or from about 1,000 to about 10,000 Dan or from about 1,500 to about 8,000 Da, or from about 2,000 to about 7,000 Da. In one preferred embodiment the molecular weights of the alkyl polyglucoside or derivative thereof are of the order of about 2,000 to about 6,000 Da; these do not bio-accumulate in the environment.

It may, in other embodiments, be that the alkyl polyglucoside or derivative thereof has a molecular weight of from about 300 to about 3000 Da, such as from about 350 to about 2500 Da, or from about 400 to about 2200 Da, or from about 450 to about 2000 Da.

In one embodiment, the alkyl polyglucoside or derivative thereof has a molecular weight of greater than about 700 Da, and optionally less than or equal to about 3000 Da. In one such embodiment, it has a molecular weight of from about 705 to about 3000 Da, such as from about 710 to about 2500 Da, or from about 715 to about 2200 Da, or from about 720 to about 2000 Da. In another embodiment, the alkyl polyglucoside or derivative thereof has a molecular weight of from about 300 to about 700 Da, such as from about 350 to about 675 Da or from about 400 to about 650 Da.

When the first surfactant comprises a derivative of an alkyl polyglucoside, this surfactant may suitably be selected from reaction products of an alkyl polyglucoside with a cross linking agent and a functionalising agent.

An example of synthesising a hydroxypropyl sulfonate co-polymer of APG is given in the following scheme:

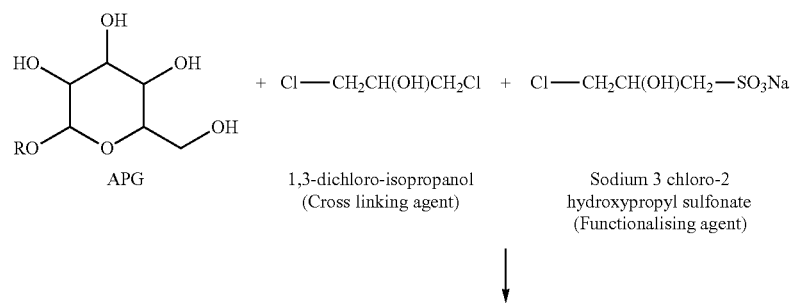

APG     1,3-dichloro-isopropanol     Sodium 3 chloro-2
            (Cross linking agent)         hydroxypropyl sulfonate
                                             (Functionalising agent)

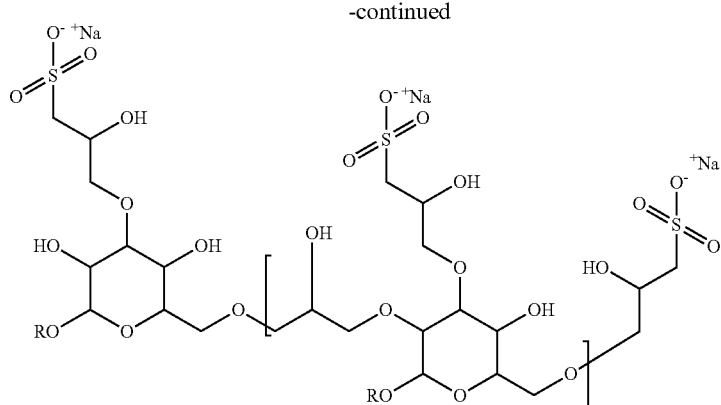

Hydroxypropyl Sulfonate/APG Crosspolymer

The crosslinking agent is suitably of formula X—$R^a$—X, where each X, which may be the same or different, is a halogen (e.g. chloro, fluoro or bromo) and $R^a$ is a C2-C18 hydrocarbon (e.g. alkyl or alkenyl), that may optionally be substituted and that may be branched or unbranched. Optional substituent groups which may replace one or more hydrogens in the hydrocarbon include hydroxy, amino, amido, nitro and alkoxy. Optional substituent groups which may replace one or more carbons in the hydrocarbon include O, N and S.

It may be that $R^a$ comprises a C2-C18 (e.g. C2-C12) alkanyl or alkenyl group, or an alkoxylated (e.g. ethoxylated, propoxylated or butoxylated) derivative thereof, and it may optionally be substituted (e.g. one or more one or more hydrogen may be replaced with substituent groups selected from hydroxy, amino, amido, nitro and alkoxy groups) and it may be branched or unbranched. $R^a$ may, for example, be a C2-C12 alkanyl or alkenyl group that may optionally be substituted (e.g. with one or more one or more hydrogen being replaced with substituent groups selected from hydroxy groups and amino groups) and that may be branched or unbranched.

In one embodiment $R^a$ is a branched or unbranched C2-C8 alkanyl (e.g. C2, C3, C4 or C5 alkanyl) that may optionally be substituted (e.g. with one or more one or more hydrogen being replaced with substituent groups selected from hydroxy groups and amino groups). In one such embodiment X is chloro.

In one embodiment the crosslinking agent is 1,3 dichloro-isopropanol:

The functionalising agent is suitably of formula X—$R^a$—Y, where X is a halogen (e.g. chloro, fluoro or bromo), $R^a$ is a C2-C18 hydrocarbon (e.g. alkyl or alkenyl), that may optionally be substituted and that may be branched or unbranched, and Y is selected from quaternary compounds (including quaternary ammonium groups), phosphate groups, carboxymethylate groups, maleate groups, sulfonate groups (including hydroxyalkylsulfonate groups), succinate groups, sulfosuccinate groups, sulfate groups and hydroxy groups.

In one such embodiment, the functionalising agent is of formula X—$R^a$—Y, where X is a halogen (e.g. chloro, fluoro or bromo), $R^a$ is a C2-C18 hydrocarbon (e.g. alkyl or alkenyl), that may optionally be substituted and that may be branched or unbranched, and Y is selected from quaternary ammonium groups, sulfonate groups, sulfate groups, phosphate groups, and hydroxy groups.

In another such embodiment, the functionalising agent is of formula X—$R^a$—Y, where X is a halogen (e.g. chloro, fluoro or bromo), $R^a$ is a C2-C18 hydrocarbon (e.g. alkyl or alkenyl), that may optionally be substituted and that may be branched or unbranched, and Y is selected from quaternary ammonium groups (including betaines), sulfonate groups, sulfate groups, phosphate groups, hydroxy groups, carboxymethylate groups, maleate groups, succinate groups and sulfosuccinate groups.

Optional substituent groups which may replace one or more hydrogens in the hydrocarbon include hydroxy, amino, amido, nitro and alkoxy. Optional substituent groups which may replace one or more carbons in the hydrocarbon include O, N and S.

In one embodiment, one or more carbon atoms in the hydrocarbon chain are replaced with oxygen.

It may be that $R^a$ comprises a C2-C18 (e.g. C2-C12) alkanyl or alkenyl group, or an alkoxylated (e.g. ethoxylated, propoxylated or butoxylated) derivative thereof, and it may optionally be substituted (e.g. one or more one or more hydrogen may be replaced with substituent groups selected from hydroxy, amino, amido, nitro and alkoxy groups) and it may be branched or unbranched.

$R^a$ may, for example, be a C2-C12 alkanyl or alkenyl group that may optionally be substituted (e.g. with one or more one or more hydrogen being replaced with substituent groups selected from hydroxy groups and amino groups) and that may be branched or unbranched.

In one embodiment $R^a$ is a branched or unbranched C2-C8 alkanyl (e.g. C2, C3, C4 or C5 alkanyl) that may optionally be substituted (e.g. with one or more one or more hydrogen being replaced with substituent groups selected from hydroxy groups and amino groups). In one such embodiment X is chloro.

Y is selected from quaternary ammonium groups, sulfonate groups, sulfate groups, phosphate groups, and hydroxy groups. It may, alternatively, be that Y is selected from quaternary ammonium groups, sulfonate groups, sulfate groups, phosphate groups, hydroxy groups, carboxymethylate groups, maleate groups, succinate groups and sulfosuccinate groups.

Quaternary ammonium groups may be of formula —$N^+R'_3$ where each R' may be the same or different and may be selected from C1-C36 hydrocarbon groups (e.g. alkyl or alkenyl), that may optionally be substituted and that may be branched or unbranched. Optional substituent groups which may replace one or more hydrogens in the hydrocarbon include hydroxy, amino, amido, carboxy, nitro and alkoxy. Optional substituent groups which may replace one or more carbons in the hydrocarbon include O, N and S.

In one embodiment, each R' may be the same or different and is selected from C1-C36 branched or unbranched alkyl groups that may optionally be substituted (e.g. one or more one or more hydrogen may be replaced with substituent groups selected from hydroxy, amino, amido, carboxy, nitro and alkoxy groups).

Preferably one or more of the R' groups are selected from methyl, ethyl or propyl. It may be that two of the R' groups are selected from methyl, ethyl or propyl and the third R' group is selected from C1-C36 branched or unbranched alkyl groups, especially unbranched alkyl groups, more especially C6-C36 unbranched alkyl groups and most especially C10-C30 unbranched alkyl groups (e.g. C12-C30 unbranched alkyl groups).

Preferably at least some of the R' groups are unsubstituted. In one preferred embodiment all of the R' groups are unsubstituted.

Sulfonate groups may be of formula —SO$_3$M where M is selected from H and monovalent cations such as Na, K, and NH$_4$.

Sulfate groups may be of formula —SO$_4$M where M is selected from H and monovalent cations such as Na, K, and NH$_4$.

Phosphate groups may be of formula —OPO(OM)$_2$ where each M is independently selected from H and monovalent cations such as Na, K, and NH$_4$.

Carboxymethylate groups may be of formula —CH$_2$CO$_2$M where M is selected from H and monovalent cations such as Na, K, and NH$_4$.

Maleate groups may be of formula

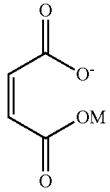

where M is selected from H and monovalent cations such as Na, K, and NH$_4$.

Succinate groups may be of formula

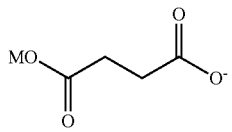

where M is selected from H and monovalent cations such as Na, K, and NH$_4$.

Sulfosuccinate groups may be of formula of formula (I) or formula (II):

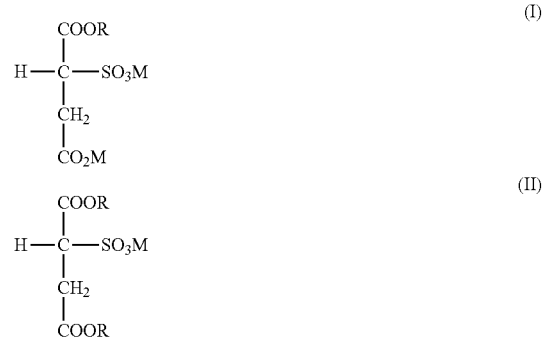

wherein
M is a monovalent or divalent cation, e.g. Na, K, or NH$_4$, and
R is a hydrocarbon group, such as a C8-30 unbranched alkyl or alkenyl group, which may optionally be alkoxylated, or such as C8-30 fatty alkanolamide group, which may optionally be alkoxylated.

In one embodiment, the functionalising agent is selected from:

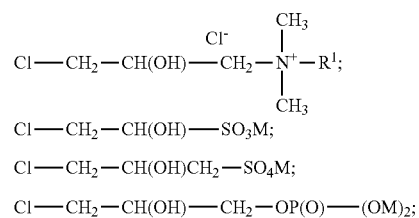

and mixtures thereof,
wherein
R$^1$ is selected from C6-C36 unbranched alkyl groups, and
M is selected from H and monovalent cations such as Na, K, and NH$_4$.

In one embodiment, the APG derivative is a betaine/APG crosspolymer. In one embodiment, the APG derivative is a phosphate/APG crosspolymer (e.g. a hydroxypropyl phosphate/APG crosspolymer). In one embodiment, the APG derivative is sulfonate/APG crosspolymer (e.g. a hydroxypropyl sulfonate/APG crosspolymer). In one embodiment, the APG derivative is a sulfosuccinate/APG crosspolymer. In one embodiment, the APG derivative is a succinate/APG crosspolymer. In one embodiment, the APG derivative is a quaternary ammonium/APG crosspolymer.

If the APG derivative is provided in the form of a salt, this may be any suitable salt. In one embodiment the salt is a salt based on a monovalent cation, such as Na, K, or NH$_4$. In one embodiment, the salt is a salt based on an alkali metal, e.g. Na or K. In one embodiment the salt is a salt based on a monovalent anion, such as Cl or Br. In one embodiment, the salt is a halide salt, e.g. Cl or Br.

Examples of APG derivatives that can be used, and commercially available products of this type, include:

| Surfactant | Commercially available from Active Colonial Chemicals as | (wt %) |
|---|---|---|
| Sodium hydroxypropyl sulfonate decyl glucose crosspolymer | PolySugaNate 100P | 40-41 |

| Surfactant | Commercially available from Colonial Chemicals as | Active (wt %) |
|---|---|---|
| Sodium hydroxypropyl sulfonate lauryl glucose crosspolymer | PolySugaNate 160P | 38-39 |
| Disodium sulfosuccinate decyl glucoside crosspolymer | PolySugaMate D | 38 (as solids) |
| Disodium sulfosuccinate lauryl glucoside crosspolymer | PolySugaMate L | 38 (as solids) |
| Sodium succinate lauryl glucoside crosspolymer | PolySugaCarb LS | 50 (as solids) |
| Poly sodium decyl glucoside hydroxypropyl phosphate | PolySugaPhos 1000P | 40 |
| Poly sodium lauryl glucoside hydroxypropyl phosphate | PolySugaPhos 1200P | 40 |
| Coco glucoside betaine crosspolymer | PolySugaBetaine C | 40 |
| Lauryl glucoside betaine crosspolymer | PolySugaBetaine L | 40 |
| Hydroxypropyltrimonium coco glucosides chloride | PolySugaQuat TM8610P | 42 |
| Stearyldimonium hydroxypropyl lauryl glucosides chloride | PolySugaQuat S-1210P | 30 |

The reactions that take place between alkyl polyglucosides and crosslinking agents and functionalising agents are described in more detail in U.S. Pat. No. 7,507,399 B1. As described in that document, the resultant product is a crosslinked polymer (crosslinked by —$R^a$— groups) but the degree of crosslinking depends of the ratio of crosslinking agent to hydroxy groups in the glucoside. Likewise, the functionalising agent will react with hydroxy groups in the glucoside and the number of groups —$R^a$—Y that replace hydroxy groups in the crosslinked glucosides will depend on the ratio of functionalising agent to hydroxy groups in the glucoside.

The alkyl polyglucosides from which the corrosion inhibiting surfactant can be derived may suitably have an alkyl group that is a C8 to C30 branched or unbranched alkyl group, such as a C8 to C25, C8 to C22, C9 to C20, C10 to C18, or C10 to C16 branched or unbranched alkyl group. In one embodiment it may be a C10 to C30 branched or unbranched alkyl group, such as a C10 to C24, or C10 to C18 branched or unbranched alkyl group.

In a preferred embodiment the alkyl polyglucoside has an alkyl group that is a C12 to C30 branched or unbranched alkyl group, such as a C12 to C25, C12 to C24, C12 to C22, C12 to C20, C12 to C18, or C12 to C16 branched or unbranched alkyl group. In one such preferred embodiment the alkyl polyglucoside may have an alkyl group that is a C12 to C24 branched or unbranched alkyl group.

Preferably the alkyl group is unsubstituted.

The skilled reader will understand that, due to the method by which they are synthesized, alkyl polyglucosides are generally present as mixtures of alkyl polyglucosides, where there are varying numbers of carbon atoms in the alkyl radical and where there are varying degrees of polymerisation. Thus, when referring to alkyl polyglucosides, the alkyl radical is generally referred to as having a range of carbon atoms, which cover the minimum and maximum length of alkyl carbon chains present in the mixture, and the degree of polymerisation is the average (mean) degree of polymerisation of the mixture.

For the alkyl polyglucoside derived products, the polyglucoside may in one embodiment have a degree of polymerisation of from 1 to 15, and preferably from 1 to 10, e.g. from 1 to 9, from 1 to 8, from 1 to 7 or from 1 to 6.

It may be from 1 to 5 or from 1 to 4. In one embodiment for the alkyl polyglucoside derived products, the polyglucoside has a degree of polymerisation of from 1 to 3; more preferably from 1 to 2; for example from 1.1 to 1.8 or from 1.1 to 1.7; such as from 1.2 to 1.6; most preferably from 1.2 to 1.5.

In one preferred embodiment, the polyglucoside has a degree of polymerisation of from 1.5 to 5 or from 1.5 to 4. In one such embodiment for the alkyl polyglucoside derived products, the polyglucoside has a degree of polymerisation of from 1.6 to 5; more preferably from 1.7 to 5; for example from 1.8 to 5 or from 2 to 5. It may be preferred that for the alkyl polyglucoside derived products, the polyglucoside has a degree of polymerisation of from 1.6 to 4; more preferably from 1.7 to 4; for example from 1.8 to 4 or from 2 to 4, e.g. from 2 to 3 or from 3 to 4.

As the skilled reader will appreciate, the degree of polymerisation can be measured by known techniques such as gel permeation chromatography.

In one embodiment, the alkyl polyglucoside is made up of units of formula (I) and/or (II):

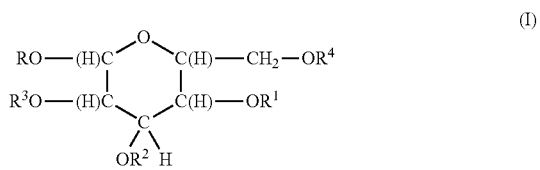

(I)

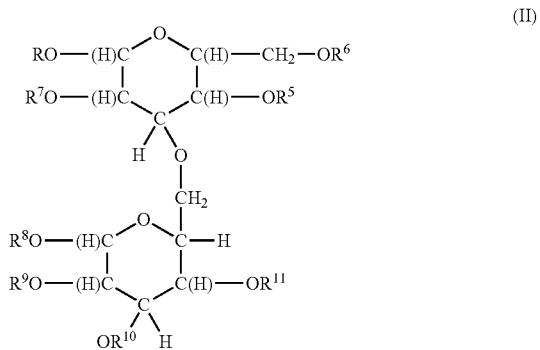

(II)

wherein

R is a C8-30 alkyl group;

$R^1$, $R^2$, $R^3$ and $R^4$ are independently selected from the group consisting of hydrogen and —$CH_2CH(OH)CH_2$—$R^{12}$, with the proviso that $R^1$, $R^2$, $R^3$ and $R^4$ are not all hydrogen;

$R^5$, $R^6$, $R^7$, $R^8$, $R^9$ and $R^{11}$ are independently selected from the group consisting of hydrogen and —$CH_2CH(OH)CH_2$—$R^{12}$, and $R^{10}$ is selected from the group consisting of hydrogen, —$CH_2CH(OH)(CH_2)_x$—$R^{12}$, and

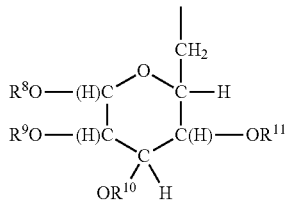

with the proviso that $R^5$, $R^6$, $R^7$, $R^8$, $R^9$, $R^{10}$ and $R^{11}$ are not all hydrogen, wherein x=0 or 1, and $R^{12}$ is a functional group selected from:

$$—O—P(O)—(OH) \quad —N^+—R^1; \quad —SO_3^-M^+ \text{ and}$$
$$\quad\quad\quad |\quad\quad\quad\quad\quad\quad |$$
$$\quad\quad\quad O^-M^+\quad\quad\quad\quad CH_3$$
$$SO_4^{-}2M^+ \quad —OH$$

(with $CH_3$ above the $N^+$)

wherein $R^1$ is selected from C6-C36 unbranched alkyl groups, and

M is selected from H and monovalent cations such as Na, K, and $NH_4$, and wherein the overall degree of polymerisation of the surfactant product (i.e. the average number of glucose units per alkyl group R) is from 1 to 15, preferably from 1 to 10, e.g. from 1 to 5.

In one embodiment the degree of polymerisation is from 1 to 5, e.g. from 1.5 to 5, or from 1.5 to 4, more preferably from 1.7 to 4 (for example from 1.8 to 4 or from 2 to 4, e.g. from 2 to 3, or from 3 to 4).

The alkyl groups R in formula (I) and (II) are C8 to C30 branched or unbranched alkyl groups, such as C8 to C25 branched or unbranched alkyl groups, e.g. C9 to C22 branched or unbranched alkyl groups; more preferably C10 to C24 branched or unbranched alkyl groups, e.g. C10 to C18 branched or unbranched alkyl groups.

In one embodiment, the alkyl polyglucoside derivative is based on decyl polyglucoside or lauryl polyglucoside or coco polyglucoside. In one embodiment, the alkyl polyglucoside derivative is based on decyl polyglucoside or lauryl polyglucoside. In one preferred embodiment, the alkyl polyglucoside derivative is based on lauryl polyglucoside.

In a preferred embodiment the alkyl groups R (i.e. the alkyl group for the alkyl polyglucosides) are C12 to C30 branched or unbranched alkyl groups, such as C12 to C25, and most preferably C12 to C24 branched or unbranched alkyl groups. In one such embodiment the alkyl groups R in formula (III) and (IV) are C12 to C22 branched or unbranched alkyl groups, such as C12 to C20 branched or unbranched alkyl groups, e.g. C12 to C18 branched or unbranched alkyl groups or C12 to C16 branched or unbranched alkyl groups.

In one embodiment, the alkyl polyglucoside derivative is selected from those described in U.S. Pat. No. 7,507,399 B1.

It may be that the alkyl polyglucoside derivative is of formula (III):

(III)

[structure diagram]

wherein n is an integer of 1 or more (e.g. from 1 to 20 or from 1 to 10), such as 2 or more (e.g. from 2 to 4), or 3 or more, and typically about 4 or more;

R is selected from C8 to C30 branched or unbranched alkyl groups;

Y is selected from quaternary ammonium groups, sulfonate groups, sulfate groups, phosphate groups, and hydroxy groups.

It may, alternatively, be that Y is selected from quaternary groups (including quaternary ammonium groups), sulfonate groups, sulfate groups, phosphate groups, hydroxy groups, carboxymethylate groups, maleate groups, succinate groups and sulfosuccinate groups.

Preferred options for R and Y are as described above.

It may be that R is selected from C10 to C24 branched or unbranched alkyl groups; most preferably C12 to C24 branched or unbranched alkyl groups, e.g. C12 to C22 branched or unbranched alkyl groups.

It may be that Y is a functional group selected from:

$$—O—P(O)—(OH) \quad —N^+—R^1; \quad —SO_3^-M^+ \text{ and}$$
$$\quad\quad\quad |\quad\quad\quad\quad\quad\quad |$$
$$\quad\quad\quad O^-M^+\quad\quad\quad\quad CH_3$$
$$SO_4^{-}2M^+ \quad —OH$$

wherein $R^1$ is selected from C6-C36 unbranched alkyl groups, and

M is selected from H and monovalent cations such as Na, K, and $NH_4$.

In one embodiment, the alkyl polyglucoside derivative is selected from:
  Sodium hydroxypropyl sulfonate decyl glucose crosspolymer
  Sodium hydroxypropyl sulfonate lauryl glucose crosspolymer
  Disodium sulfosuccinate decyl glucoside crosspolymer
  Disodium sulfosuccinate lauryl glucoside crosspolymer
  Sodium succinate lauryl glucoside crosspolymer
  Poly sodium decyl glucoside hydroxypropyl phosphate
  Poly sodium lauryl glucoside hydroxypropyl phosphate
  Coco glucoside betaine crosspolymer
  Lauryl glucoside betaine crosspolymer
  Hydroxypropyltrimonium coco glucosides chloride
  Stearyldimonium hydroxypropyl lauryl glucosides chloride.

In one embodiment, the alkyl polyglucoside derivative is selected from:
  Sodium hydroxypropylsulfonate decyl-glucoside crosspolymer
  Sodium hydroxypropylsulfonate lauryl-glucoside crosspolymer
  Sodium hydroxypropylphosphate laurylglucoside crosspolymer
  Sodium bis-hydroxyethylglycinate lauryl-glucosides crosspolymer
  Hydroxypropyltrimethylammmonium coco glucosides chloride
  Stearyldimethylammoniumhydroxypropyl lauryl glucosides chloride.

In one embodiment, the alkyl polyglucoside derivative is selected from:
  Sodium hydroxypropylsulfonate lauryl-glucoside crosspolymer Sodium hydroxypropylphosphate laurylglucoside crosspolymer Sodium bis-hydroxyethylglycinate lauryl-glucosides crosspolymer Stearyldimethylammoniumhydroxypropyl lauryl glucosides chloride.

In one embodiment, the alkyl polyglucoside derivative is selected from:

Sodium hydroxypropylsulfonate lauryl-glucoside crosspolymer

Stearyldimethylammoniumhydroxypropyl lauryl glucosides chloride.

In one embodiment, the alkyl polyglucoside derivative is selected from:

Disodium sulfosuccinate decyl glucoside crosspolymer

Disodium sulfosuccinate lauryl glucoside crosspolymer

Coco glucoside betaine crosspolymer

Lauryl glucoside betaine crosspolymer.

In one embodiment the alkyl polyglucoside derivative is selected from:

Lauryl glucoside betaine crosspolymer

Disodium sulfosuccinate lauryl glucoside crosspolymer.

The second surfactant may be amphoteric, cationic, anionic, or non-ionic, or may be a mixture of two or more such surfactants.

The second surfactant may be amphoteric. The second surfactant may be selected from C8-C22 betaines and salts thereof, C8-C22 sultaines and salts thereof, C8-C22 propionates and salts thereof, cationic surfactants, anionic surfactants, non-ionic surfactants and mixtures thereof. Preferably the second surfactant is selected from C8-C22 betaines and salts thereof, C8-C22 sultaines and salts thereof, C8-C22 propionates and salts thereof, and mixtures thereof.

The second surfactant may be selected from C8-C18 betaines and salts thereof, C8-C18 sultaines and salts thereof, C8-C18 propionates and salts thereof, cationic surfactants, anionic surfactants, non-ionic surfactants and mixtures thereof. Preferably the second surfactant is selected from C8-C18 betaines and salts thereof, C8-C18 sultaines and salts thereof, C8-C18 propionates and salts thereof, and mixtures thereof.

In embodiments of the invention the C8-C22 (e.g. C8-18) sultaine is typically selected from the group consisting of alkyl hydroxysultaines, alkyamidopropyl hydroxysultaines, alkyl amphohydroxypropylsulfonates, salts thereof, and combinations thereof.

In further embodiments of the invention, the C8-C22 (e.g. C8-18) betaine is selected from the group consisting of alkyl dimethylbetaines, alkylamidopropyl betaines, alkylampho(di)acetates, salts thereof, and combinations thereof.

In still further embodiments of the invention, the C8-C22 (e.g. C8-18) propionate is selected from the group consisting of alkyl ampho(di)propionate, alkyl aminopropionates, alkyl amphopropionates, salts thereof, and combinations thereof.

It may be that the second surfactant is selected from C9-C21 sultaines and salts thereof, C9-C21 betaines and salts thereof, C9-C21 propionates and salts thereof, and mixtures thereof; such as C10-C20 sultaines and salts thereof, C10-C20 betaines and salts thereof, C10-C20 propionates and salts thereof, and mixtures thereof; or C11-C19 sultaines and salts thereof, C11-C19 betaines and salts thereof, C11-C19 propionates and salts thereof, and mixtures thereof; or C12-C18 sultaines and salts thereof, C12-C18 betaines and salts thereof, C12-C18 propionates and salts thereof, and mixtures thereof.

In still further embodiments of the invention the cationic surfactant is selected from benzalkonium salts, C10-20 alkyl trimethyl ammonium salts, and C10-20 alkyl trimethyl or tris(hydroxymethyl) phosphonium salts.

In yet further embodiments of the invention the anionic surfactant is selected from acyl glutamates, acyl taurates, sulfosuccinates, alkyl ether carboxylates, C10-20 alkyl benzene sulphonates, C10-20 olefin sulphonates, C10-20 alkyl sulfates, C10-20 alkyl 1 to 25 mole ether sulfates, α-olefin sulfonates, C10-20 paraffin sulphonates, C10-20 alkyl phenol sulfates, lignin sulphonates, fatty ester sulphonates, C10-20 alkyl phenol ether sulfates, C10-20 alkyl ethanolamide sulfates, and C10-20 alpha sulphofatty acid salts.

In yet further embodiments of the invention the non-ionic surfactant is selected from acyl sarcosinates, isethionates, ethoxylated fatty acids, ethoxyl/propyleneoxy block copolymers, ethoxylated fatty amines, mono- and di-alkanolamides, amine oxides and C10-20 acyl sorbitan and glyceryl ethoxylates.

In one embodiment, the second surfactant is selected from:

Anionic surfactants selected from: C8-18 alkyl ether sulfates, C8-18 alkyl sulfates, C8-18 alpha olefin sulfonates, C8-18 acyl sarcosinates, C8-18 alkyl ether carboxylates, plant saponins (quillaja, yucca), linear alkyl benzene sulfonates, C8-18 N-methyl taurates, C8-18 sulfosuccinates, C8-18 acyl glutamates, C8-18 alkyl polyglucoside derivatives, e.g. sulfates or carboxylates (e.g. Plantapon LGC Sorb ex BASF), C8-18 phosphate esters, C8-18 alkyl phosphonic acids;

Amphoteric surfactants selected from: C8-18 alkyl amido propyl betaines, C8-18 alkyl dimethyl betaines, C8-18 alkyl ampho(di)acetates, C8-18 alkyl ampho(di)propionates, C8-18 alkyl imino(di)propionates, C8-18 alkyl amidopropyl hydroxysultaines;

Non-ionic surfactants selected from: C8-18 alcohol ethoxylates, sorbitan esters, sorbitan ethoxylates, fatty acid ethoxylates, sucrose esters, C8-18 dimethyl or amidoamine oxides, C8-18 fatty acid alkanolamides;

Cationic surfactants selected from: C8-18 alkylamido amines, C8-18 ester quats (i.e. quaternary ammonium compounds of formula $R_4N^+X^-$ where the R groups are each independently long chain alkyl moieties, e.g. C8-C22 alkyl or C8-C22 alkenyl, which are linked to the $N^+$ by an ester bond, and with $X^-$ being a counter ion, e.g. Cl or Br or $CH_3SO_4$).

In some embodiments of the invention the second surfactant is selected from:

a C8-C22 (e.g. C8-18) sultaine selected from the group consisting of alkyl hydroxysultaines, alkyl amidopropyl hydroxysultaines, alkyl amphohydroxypropylsulfonates, salts thereof, and combinations thereof;

a C8-C22 (e.g. C8-18) betaine selected from the group consisting of alkyl dimethylbetaines, alkylamidopropyl betaines, alkylampho(di)acetates, salts thereof, and combinations thereof;

a C8-C22 (e.g. C8-18) propionate selected from the group consisting of alkyl ampho(di)propionates (i.e. alkyl ampho monopropionates and alkyl ampho dipropionates), alkyl amino(di)propionates (i.e. alkyl amino monopropionates and alkyl amino dipropionates), alkyl imino(di)propionates (i.e. alkyl imino monopropionates and alkyl imino dipropionates), salts thereof, and combinations thereof.

In some embodiments of the invention the second surfactant is selected from: C8-C22 (e.g. C8-18) sultaines and C8-C22 (e.g. C8-18) propionates. Preferably the C8-C22 (e.g. C8-18) sultaines are of the type mentioned in the above paragraph. Preferably the C8-C22 (e.g. C8-18) propionates are of the type mentioned in the above paragraph. It may be that the second surfactant is selected from C8-C22 (e.g. C8-18) sultaines, e.g. of the type mentioned in the above paragraph.

In some embodiments of the invention the second surfactant is selected from:
- a C8-C16 (e.g. C8-14 or C10-12) sultaine selected from the group consisting of alkyl hydroxysultaines, alkyl amidopropyl hydroxysultaines, alkyl amphohydroxypropylsulfonates, salts thereof, and combinations thereof;
- a C8-C16 (e.g. C8-14 or C10-12) betaine selected from the group consisting of alkyl dimethylbetaines, alkylamidopropyl betaines, alkylampho(di)acetates, salts thereof, and combinations thereof.
- a C8-C16 (e.g. C8-14 or C10-12) propionate selected from the group consisting of alkyl ampho(di)propionate, alkyl amino(di)propionates, alkyl imino(di)propionates, salts thereof, and combinations thereof.

In some embodiments of the invention the second surfactant is selected from: C8-C16 (e.g. C8-14 or C10-12) sultaines and C8-C16 (e.g. C8-14 or C10-12) propionates. Preferably the C8-C16 (e.g. C8-14 or C10-12) sultaines are of the type mentioned in the above paragraph. Preferably the C8-C16 (e.g. C8-14 or C10-12) propionates are of the type mentioned in the above paragraph. It may be that the second surfactant is selected from C8-C16 (e.g. C8-14 or C10-12) sultaines, e.g. of the type mentioned in the above paragraph.

In some embodiments of the invention the second surfactant is selected from:
- a C8-C12 sultaine selected from the group consisting of alkyl hydroxysultaines, alkyamidopropyl hydroxysultaines, salts thereof, and combinations thereof;
- a C8-C12 betaine selected from the group consisting of alkyl dimethylbetaines, alkylamidopropyl betaines, alkylampho(di)acetates, salts thereof, and combinations thereof.
- a C8-C12 propionate selected from the group consisting of alkyl ampho(di)propionates, alkyl amino(di)propionates, salts thereof, and combinations thereof.

In some embodiments of the invention the second surfactant is selected from: C8-18 alkyl amido propyl betaines, C8-18 alkyl dimethyl betaines, C8-18 alkyl ampho(di)acetates, C8-18 alkyl ampho(di)propionates, C8-18 alkyl imino(di)propionates, and C8-18 alkyl amidopropyl hydroxysultaines.

In some embodiments of the invention the second surfactant is selected from: C10-16 alkyl amido propyl betaines, C10-16 alkyl dimethyl betaines, C10-16 alkyl ampho(di)acetates, C10-16 alkyl ampho(di)propionates, C10-16 alkyl imino(di)propionates, and C10-16 alkyl amidopropyl hydroxysultaines.

In some embodiments of the invention the second surfactant is selected from: C8-12 alkyl amido propyl betaines, C8-12 alkyl dimethyl betaines, C8-12 alkyl ampho(di)acetates, C8-12 alkyl ampho(di)propionates, C8-12 alkyl imino(di)propionates, and C8-12 alkyl amidopropyl hydroxysultaines.

In some embodiments of the invention the second surfactant is selected from: C10-14 alkyl amido propyl betaines, C10-14 alkyl dimethyl betaines, C10-14 alkyl ampho(di)acetates, C10-14 alkyl ampho(di)propionates, C10-14 alkyl imino(di)propionates, and C10-14 alkyl amidopropyl hydroxysultaines.

In some embodiments of the invention the second surfactant is selected from: C12-14 alkyl amido propyl betaines, C12-14 alkyl dimethyl betaines, C12-14 alkyl ampho(di)acetates, C12-14 alkyl ampho(di)propionates, C12-14 alkyl imino(di)propionates, and C12-14 alkyl amidopropyl hydroxysultaines.

In some embodiments of the invention the second surfactant is selected from:
Lauramidopropyl hydroxysultaine
Cocamidopropyl hydroxysultaine
Lauramidopropyl betaine
Cocoamidopropyl betaine
Disodium lauramphodiacetate
Disodium cocoamphodiacetate
Disodium lauraminodipropionate
Disodium cocaminodipropionate
C12/C14 alkyl dimethyl betaine
and any variations of these surfactants where the surfactant is not in the form of a salt, or is in the form of a potassium salt, or is in the form of a sodium salt In some embodiments of the invention the second surfactant is selected from:
Lauramidopropyl hydroxysultaine
Cocamidopropyl hydroxysultaine
Lauramidopropyl betaine
Disodium lauramphodiacetate
Disodium lauraminodipropionate
and any variations of these surfactants where the surfactant is not in the form of a salt, or is in the form of a potassium salt, or is in the form of a sodium salt Examples of surfactants that can be used as the second surfactant, and commercially available products of this type, include:

| Surfactant | Commercially available from Solvay as | Active (%) |
|---|---|---|
| Lauramidopropyl hydroxysultaine. | Mackam LSB-50 | 40 |
| Cocamidopropyl hydroxysultaine | Mackam CBS-50G-E | 40 |
| Lauramidopropyl betaine 70% lauric fatty acid cut | Mackam LMB | 30 |
| Disodium lauramphodiacetate | Miranol Ultra L32-E | 30 |
| Disodium lauraminodipropionate | Mirataine H2-CHA | 30 |

AGRHO FKC/1000 (ex Solvay) can also be mentioned, which is a potassium salt of an alkyl dimethyl betaine (70% C12 alkyl, 30% C14 alkyl).

It may be that in the present invention the first and second surfactants are used in the reservoir so as to give a total active surfactant concentration of 100 ppm or more; or 150 ppm or more; or 200 ppm or more; or 250 ppm or more; or 300 ppm or more; or 400 ppm or more; or 500 ppm or more. For example, it may be from 50 ppm to 10,000 ppm; or from 100 ppm to 5,000 ppm; preferably from 150 ppm to 5,000 ppm, e.g. from 300 ppm to 3,000 ppm or from 500 ppm to 2,000 ppm. In one embodiment, it is from 200 to 5,000 ppm, such as from 200 to 1500 ppm, e.g. from 250 to 1250 ppm.

The surfactant compositions of the invention may comprise further additives.

The surfactant composition may optionally further comprise one or more additives selected from the group consisting of: solvents, demulsifiers, biocides, dispersants, scale inhibitors, chelants, scavengers, corrosion inhibitors, co-surfactants, and combinations thereof. One or more coupling agents may be present as an optional component.

When a solvent is used as an additional component, the solvent may be aqueous or may be organic. The solvent may be any suitable solvent that is compatible with the aqueous fluid. Examples of solvents include water, dimethyl sulfoxide (DMSO), alkylene glycols, glycol ethers, and tetrahydrofuran (THF). Solvents may be selected from the group consisting of alcohols, preferably methanol, iso-propanol or butanol; and combinations thereof. In one embodiment the solvent is selected from: water, dimethyl sulfoxide (DMSO), alkylene glycols, glycol ethers, tetrahydrofuran (THF), C1-4 straight or branched chain alcohols, (e.g. methanol, iso-propanol, n-butanol), and combinations thereof.

Typically, the solvent comprises from about 1% to about 5% by weight of the surfactant composition. However, it could be from about 0.5 to about 20% by eight, e.g. from 1 to 15% by weight or from 2 to 10% by weight.

Scale inhibitors may suitably be selected from the group consisting of halite inhibitors, preferably polyaspartates; tetrasodium iminosuccinate; citrates; phosphonates; vinyl copolymers; polyacrylates; polymaleates; polysulfonates; and bisphosphonates; and combinations thereof. Scale inhibitors may be selected from sequestrants, such as sodium tripolyphosphate, sodium ethylenediamine tetracetate, sodium nitrilo triacetate, tetra potassium pyrophosphate, acetodiphosphonic acid and its salts, alkanolamine esters of phosphoric acid, e.g. triethanolamine phosphates ester, ammonium trismethylene phosphonic acid and its salts, ethylenediamine tetrakis(methylene phosphonic) acid and its salts, diethylenetriamine pentakis(methylene phosphonic) acid, hexamethylenediamine tetrakis(methylene phosphonic) acid, bishexamethylenetriamine pentakis(methylene phosphonic) acid, and ethanolamine bis(methylenephosphonic) acid and its salts.

Typically, when scale inhibitor is included, it will comprise from about 1% to about 5% by weight of the surfactant composition.

If a scavenger is included, typically it may be selected from the group consisting of hydrogen sulphide scavengers, oxygen scavengers, and combinations thereof. Typically, when scavenger is included, it will comprise from about 1% to about 5% by weight of the surfactant composition. However, in embodiments there may be no scavenger present.

When a corrosion inhibitor is included, that additional corrosion inhibitor may be selected from non-ionic, anionic, cationic and amphoteric corrosion inhibitors.

In one embodiment, the corrosion inhibitor is a non-ionic corrosion inhibitor, such as an inhibitor selected from fatty diamine derivatives of oleic or tall oil fatty acids, and fatty acid alkanolamides such as monoisopropyl oleamide. In one embodiment, the corrosion inhibitor is an anionic corrosion inhibitor, such as an inhibitor selected from alkyl and alkyl ether phosphate esters, acyl sarcosinates, taurides and alkyl ether carboxylic acids. In one embodiment, the corrosion inhibitor is a cationic corrosion inhibitor, such as an inhibitor selected from quaternary ammonium salts, such as alkyl trimethyl ammonium halides or benzalkonium derivatives, fatty amines, amidoamines (including alkylamidopropyl amines and imidazolines). For example, it may be an alkyl hydroxyethyl or alkyl aminoethyl derivative of oleic or tall oil fatty acids.

Typically, when corrosion inhibitor is included, it will comprise from about 0.1% to about 10% by weight of the surfactant composition, e.g. from about 0.5% to about 5% by weight of the surfactant composition.

Synergists for corrosion inhibitors may optionally be used and are typically selected from the group consisting of mercaptocarboxylic acids, preferably thioglycolic acid; polyaminocaboxylic acids. Typically, when present, they comprise from about 1% to about 5% by weight of the surfactant composition. Further information may be found in Chapter 8, 'Production Chemicals for the Oil and Gas Industry', M A Kelland, CRC Press (2010)

When an additional surfactant is used (i.e. in addition to the first surfactant and second surfactant), the additional surfactant may be a cationic surfactant (for example it may be selected from benzalkonium salts and C10-20 alkyl trimethyl ammonium salts). Alternatively, the additional surfactant may be anionic (for example it may be selected from C10-20 alkyl benzene sulphonates, C10-20 olefin sulphonates, C10-20 alkyl sulfates, C10-20 alkyl 1 to 25 mole ether sulfates, C10-20 paraffin sulphonates, C10-20 alkyl phenol sulfates, lignin sulphonates, fatty ester sulphonates, C10-20 alkyl phenol ether sulfates, C10-20 alkyl ethanolamide sulfates, and C10-20 alpha sulphofatty acid salts). The additional surfactant might alternatively be non-ionic (for example it may be selected from ethoxylated fatty acids, ethoxyl/propyleneoxy block copolymers, ethoxylated fatty amines, mono- and di-alkanolamides, amine oxides and C10-20 acyl sorbitan and glyceryl ethoxylates). The additional surfactant might alternatively be an amphoteric surfactant (for example it may be selected from alkyl amphoacetates, alkyl amphopropionates, alkyl iminopropionates, alkyl amphohydroxypropyl sulfonates, alkyl hydroxysultaines, alkyl amidopropyl hydroxysultaines, alkyldimethyl and alkylamidopropyl betaines).

Additional surfactant might for example be included in an amount of from 0.5 to 10% by weight, e.g. from 1 to 5% by weight.

A demulsifier may be beneficial as an additional component when the surfactant is being used in oilfield applications. Examples of demulsifers include phenol-formaldehyde resins; polyamines; di-epoxides; and polyols. Typically, when present, they comprise from about 1% to about 5% by weight of the surfactant composition.

When a dispersant is used as an additional component, the dispersant may, for example, be selected from polymaleic acids, polyacrylic acids and polyvinylsulphonic acids. Typically, when present, they comprise from about 1% to about 5% by weight of the surfactant composition.

When a biocide is used as an additional component, the biocide may, for example, be a quaternary ammonium or phosphonium compound, such as an ADBAC quaternary ammonium compound, or formaldehyde glutaraldehyde, or a C10-20 alkyl trimethyl or tetrakis(hydroxymethyl) phosphonium salt.

Coupling agents may be present as an optional component. When a coupling agent is used as an additional component, the agent may, for example, be selected from glycols (e.g. monoethylene glycol, propylene glycol or hexylene glycol), glycol ethers (such as ethylene glycol mono-n butyl ether) or esters (such as RHODISOLV POLARCLEAN from Solvay, which is methyl-5-dimethyl-amino-2-methyloxopentanoate). Typically, when present, they comprise from about 0.5% to about 20% by weight of the surfactant composition, e.g. from about 1 to 10 wt %.

The two surfactants may, in one embodiment, be used in combination in an environment that has a pH that is about neutral, e.g. having a pH of from about 6 to about 8, e.g. from about 6.5 to about 7.5.

It will be appreciated by the skilled reader that, unless stated to the contrary, all preferred features of any one of the aspects of the invention apply equally to the other aspects of the invention, mutatis mutandis.

All percentages in the specification are by weight, unless otherwise stated.

EXAMPLES

The invention will now be described by way of the following non-limiting examples.

Synergistic responses were investigated for mixtures of the surfactants according to the invention. The total active concentration was 1000 ppm and the ratios based on active content were 80/20, 60/40, 50/50, 40/60 and 20/80 respectively.

Static foam tests were performed.

As is known in the art, static foam tests provide a rapid and relatively straightforward method to screen the foam performance of surfactants. The methods provide information on the stability and quality of the foam produced. Without being bound by theory, the mechanical properties of the foam lamellae and foam structure are determined to some extent by the packing of the surfactant molecules at the gas/liquid interface. In turn, the foam structure influences liquid drainage rates and therefore, the persistence or stability of the foam.

In order to perform static foam testing, 10% aqueous stock solutions of the surfactant compositions were prepared in distilled water. These were added to 10% w/w aqueous sodium chloride solution, such that the concentration of the surfactant in the brine was 1000 ppm.

Surfactant compositions according to the invention were benchmarked against the individual surfactants. A Waring type blender was used.

The flash foam volumes were measured by taking 200 ml of a surfactant composition according to the invention, subjecting it to high shear for 30 seconds at ambient temperature (20° C.) and then transferring the foam immediately to a measuring cylinder (1000 ml) for measurement. This initial volume was the flash volume. The foam and liquid volume was monitored for a further 10 minutes.

Static foam performance of the surfactants was assessed using key performance indicators described in US 2004121917 A1.

The 'half-life' of the foam was defined as the time taken for 100 ml of fluid to drain from the foam. Without being bound by theory, an increase in the half-life corresponds to a reduction in the liquid drainage rate and reflects the texture of the foam. Denser foams, as a rule, tend to take longer to drain and therefore are more persistent.

Dynamic foam tests were also performed.

A dynamic foam test apparatus based on the Bikerman test—described in R J Pugh, Handbook of Applied Surface and Colloid Chemistry, Volume 2, Eds K Holmberg, D O Shah, M J Schwager, J Wiley & Sons (2002), Chapter 8—was constructed to assess the liquid unloading properties of the surfactant compositions. The design was similar to equipment described in D T Nguyen, Petroleum Science & Technology, 2009, 27, 743. The apparatus was comprised of a jacketed glass column, the length and diameter could be varied, and a foam generator (fitted with a No 2 glass frit) attached to the base of the column. Nitrogen gas was fed through the generator and the flow rate adjusted using a flow meter to agitate the test solution. An overflow adapter and condenser attached to the top of the column permitted the liquid to be collected in a measuring cylinder (e.g. 1000 ml).

Liquid unloading experiments were carried out using 1000 ppm active surfactant and the following conditions:

Neutral pH and 10% w/w NaCl at 80° C.

A model condensate comprised of 80% v/v ISOPAR M (C9-15 iso-paraffins) and 20% v/v n-heptane.

The gas flow rate was 1.5 l/min and the brine/oil ratio was 50/50 v/v.

By performing the static and dynamic foam tests, the inventors identified synergistic traits for the surfactant compositions according to the invention and demonstrated their suitability for use in liquid unloading from a hydrocarbon reservoir.

In particular, synergistic effects in terms of the liquid unloading efficiency were found for alkyl polyglucoside derivatives (such as lauryl glucoside betaine crosspolymer) in combination with amphoteric surfactants (such as lauramidopropyl hydroxysultaine).

The alkyl polyglucoside derivatives were reaction products of an alkyl polyglucoside with a cross linking agent and a functionalising agent. The crosslinking agent is of formula X—$R^a$—X, where each X, which may be the same or different, is a halogen and $R^a$ is a C2-C18 hydrocarbon group that may optionally be substituted and that may be branched or unbranched. The functionalising agent is of formula X—$R^a$—Y, where X is a halogen, $R^a$ is a C2-C18 hydrocarbon group that may optionally be substituted and that may be branched or unbranched, and Y is selected from quaternary compounds (including quaternary ammonium groups), phosphate groups, carboxymethylate groups, maleate groups, sulfonate groups (including hydroxyalkylsulfonate groups), succinate groups, sulfosuccinate groups, sulfate groups and hydroxy groups. The alkyl polyglucoside has a degree of polymerisation of from 1 to 5 and the alkyl group of this alkyl polyglucoside is a C12-24 branched or unbranched alkyl.

The amphoteric surfactants were C8-C22 betaines and salts thereof, or C8-C22 sultaines and salts thereof, or C8-C22 propionates and salts thereof.

Synergy was seen across a range of ratios of alkyl polyglucoside derivative to amphoteric surfactant, including from about 5:1 to about 1:5.

Detailed Examples

Example 1

Dynamic Foam Test-Liquid Unloading

A dynamic foam test apparatus—based on the Bikerman test (R J Pugh, Handbook of Applied Surface and Colloid Chemistry, Volume 2, Eds K Holmberg, D O Shah, M J Schwager, J Wiley & Sons (2002), Chapter 8)—was constructed to assess the liquid unloading properties of the mixed surfactant compositions. The design was similar to equipment described in literature (D T Nguyen, Petroleum Science & Technology, 2009, 27, 743). The apparatus comprised a jacketed glass column (the length and diameter could be varied) and a foam generator (fitted with a No 2 glass frit) attached to the base of the column.

Nitrogen gas was fed through the generator and the flow rate adjusted using a flow meter to agitate the test solution. An overflow adapter and condenser attached to the top of the column permitted the liquid to be collected in a measuring cylinder (e.g. 1000 ml). Furthermore, the apparatus could be dismantled after use for cleaning.

Liquid unloading experiments were carried out using 1000 ppm active surfactant(s) and the following conditions:

Neutral pH and 10% w/w or 20% w/w NaCl respectively at 80° C.

A model condensate comprised of ISOPAR M (C9-15 iso-paraffins).

The gas flow rate was 0.5-1.0 l/min and the brine/oil ratio was 50/50 v/v.

Brine/condensate ratio: the condensate loading was increased to 80% v/v and the liquid unloading performance for systems exhibiting synergistic patterns in the previous set of experiments was evaluated.

10% active aqueous solutions of the surfactants were prepared for the tests. The solutions permitted blending together in different ratios with surfactant typically used in foamer applications in order to assess the synergistic attributes of the mixtures. The solutions (2.6 g—equivalent to 1000 ppm active surfactant) were added dropwise through the top of the apparatus into the brine and hydrocarbon mixture (260 ml).

The brine and hydrocarbon was allowed to equilibrate at the appropriate temperature, of about 80° C., before the surfactant was added. The gas was injected through the base of the column (about 1.0 l/min) and the foam generated was allowed to overflow from the column into a clean, pre-weighed 1000 ml measuring cylinder for 15 minutes.

The measuring cylinder permitted the measurement of the foam volume and the respective amounts of brine and hydrocarbon recovered from the column. When the test had been completed, the gas flow was turned off and the measuring cylinder was weighed. The apparatus was cleaned before repeating the test with additional surfactant blends.

Liquid Unloading Performance

Liquid unloading efficiencies of the foamer systems were calculated using the following expression:

$$\text{Liquid unloading (\%)} = \frac{\text{Weight of fluid recovered}}{\text{Total weight of fluid(brine + hydrocarbon)}} \times 100$$

The liquid unloading efficiencies of surfactant compositions comprising POLYSUGABETAINE L (lauryl glucoside betaine crosspolymer) and MACKAM LSB-50 (lauramidopropyl hydroxysultaine) were determined. The total active surfactant concentration was 1000 ppm. The gas flow rate was 1.0 l/min. The temperature was 80° C.

The brine used comprised either (i) 50/50 v/v 10% NaCl and ISOPAR M or (ii) 50/50 v/v 20% NaCl and ISOPAR M.

The results are given in the following table:

| PolySugaBetaine L | Liquid Unloading Efficiency (%) | | | | | | |
|---|---|---|---|---|---|---|---|
| Concentration | 0% | 20% | 40% | 50% | 60% | 80% | 100% |
| Mackam LSB-50 10% w/w NaCl | | 90.0 | 96.5 | 95.8 | 95.5 | 89.8 | 91 | 80.1 |
| Mackam LSB-50 20% w/w NaCl | | 78.3 | 93.7 | 89.2 | 86.9 | 91.5 | 90.6 | 77.9 |

It can be seen that synergistically beneficial effects are achieved when the two surfactants are used in combination, when compared to either (i) just the lauryl glucoside betaine crosspolymer being used on its own (i.e. PolySugaBetaine L concentration=100%) or (ii) just the lauramidopropyl hydroxysultaine being used on its own (i.e. PolySugaBetaine L concentration=0%).

The synergistic effect is seen with from 20% to 80% lauryl glucoside betaine crosspolymer, with the balance being lauramidopropyl hydroxysultaine, i.e. with ratios of from 4:1 to 1:4 of first surfactant:second surfactant.

Liquid unloading efficiencies can also be achieved at other total active surfactant concentrations, e.g. 250 ppm, 500 ppm and 750 ppm, with synergistically beneficial effects being achieved when the two surfactants are used in combination to make up that total active surfactant concentration rather than just the alkyl polyglucoside derivative (such as lauryl glucoside betaine crosspolymer) being used on its own or just the amphoteric surfactant (such as lauramidopropyl hydroxysultaine) being used on its own.

Similar synergistically beneficial effects may be achieved when other similar combinations of two surfactants are used, e.g. when the alkyl polyglucoside derivative is selected from:

Sodium hydroxypropyl sulfonate decyl glucose crosspolymer
Sodium hydroxypropyl sulfonate lauryl glucose crosspolymer
Disodium sulfosuccinate decyl glucoside crosspolymer
Disodium sulfosuccinate lauryl glucoside crosspolymer
Sodium succinate lauryl glucoside crosspolymer
Poly sodium decyl glucoside hydroxypropyl phosphate
Poly sodium lauryl glucoside hydroxypropyl phosphate
Coco glucoside betaine crosspolymer
Lauryl glucoside betaine crosspolymer
Hydroxypropyltrimonium coco glucosides chloride
Stearyldimonium hydroxypropyl lauryl glucosides chloride.

and when the second surfactant is selected from:
Lauramidopropyl hydroxysultaine.
Cocamidopropyl hydroxysultaine
Lauramidopropyl betaine
Disodium lauramphodiacetate
Disodium lauraminodipropionate Conclusion Synergistic effects in terms of liquid unloading efficiencies are achieved by using a combination of an alkyl polyglucoside derivative (such as lauryl glucoside betaine crosspolymer) together with an amphoteric surfactant (such as lauramidopropyl hydroxysultaine).

Example 2

Foam Persistence-Static Tests

Static foam tests are a rapid and relatively straightforward method to screen the foam performance of surfactants. The method provides information on the stability and quality, i.e. texture (structure), of the foam produced in a Waring blender. The mechanical properties of the foam lamellae and foam structure are determined to some extent by the packing of the surfactant molecules at the gas/liquid interface. The foam structure influences liquid drainage rates and therefore, the persistence or stability of the foam.

Surfactant solutions (200 ml) were subjected to high shear for 30 seconds at ambient temperatures and the foam transferred immediately to a measuring cylinder (1000 ml). The foam and liquid volume was monitored for a further 10 minutes. 10% active aqueous stock solutions of the surfactants were prepared in distilled water and these were added to 10% w/w aqueous sodium chloride solution. The concentration of the surfactant in the brine was 1000 ppm.

| Surfactant | Foam Volume (ml) | | | | | |
|---|---|---|---|---|---|---|
| (1000 ppm) | 0 s | 120 s | 240 s | 360 s | 480 s | 600 s |
| Mackam LSB-50 | 600 | 406 | 350 | 280 | 240 | 210 |
| Mackam LMB | 670 | 524 | 486 | 430 | 360 | 350 |
| PolySugaBetaine L | 300 | 140 | 110 | 100 | 90 | 90 |
| PolySugaMate D | 370 | 230 | 170 | 150 | 125 | 120 |
| PolySugaMate L | 340 | 280 | 170 | 170 | 160 | 155 |
| PolySugaNate 160P | 310 | 90 | 80 | 70 | 70 | 60 |
| PolySugaPhos 1000P | 350 | 170 | 155 | 140 | 130 | 120 |
| PolySugaPhos 1200P | 300 | 90 | 70 | 70 | 70 | 70 |

-continued

| Surfactant (1000 ppm) | Half-life (seconds) | Foam Quality (%) |
|---|---|---|
| Mackam LSB-50 | 192 | 66.7 |
| Mackam LMB | 270 | 70.1 |
| PolySugaBetaine L | 40 | 40.1 |
| PolySugaMate D | 39 | 45.9 |
| PolySugaMate L | 28 | 41.0 |
| PolySugaNate 160P | 24 | 35.5 |
| PolySugaPhos 1000P | 31 | 42.9 |
| PolySugaPhos 1200P | 25 | 33.3 |

$$\text{Foam Quality (\%)} = \frac{\text{(Initial foam volume} - \text{liquid volme)}}{\text{Initial foam volume}} \times 100$$

The initial foam volume is also called the 'flash' foam.

The alkyl polyglucoside derivatives did not produce such long half-lives compared to the amphoteric surfactants in the static foam tests in high TDS (total dissolved solids) brine.

Having shorter half lives can be an advantage, especially when foam persistence in production lines could be an issue.

The alkyl polyglucoside derivatives can therefore be used in combination with amphoteric surfactants, or other surfactants, to obtain a surfactant composition that has a desirable half life and thus has an acceptable foam persistence when taking into account the location where the surfactant composition is to be used.

Example 3

Foam Persistence-Dynamic Tests

In dynamic tests the alkyl polyglucoside derivatives POLYSUGABETAINE L (ex Colonial Chemicals, lauryl glucoside betaine crosspolymer) and POLYSUGAMATE L (ex Colonial Chemicals, disodium sulfosuccinate lauryl glucoside crosspolymer) were found to produce more persistent foam compared to typical foamer surfactants (betaines and sultaines) in static foam tests. The betaines and sultaines tested were MACKAM LSB-50 (ex Solvay, lauramidopropyl hydroxysultaine), MIRANOL ULTRA L-32E (ex Solvay, disodium laurampho(di)acetate), and MACKAM LMB (ex Solvay, lauramidopropyl betaine).

The foams from the alkyl polyglucoside derivatives appeared to consist of smaller bubbles and as a result were stiff and viscous.

When the alkyl polyglucoside derivatives are used together with a second surfactant which is selected from amphoteric surfactants, cationic surfactants, anionic surfactants, non-ionic surfactants, and mixtures thereof, there is a beneficial effect in terms of increased stability of the foam obtained from the surfactant composition.

The alkyl polyglucoside derivatives enhance the stability of the foam by increasing the viscosity of the bulk liquid trapped in the foam lamellae, as well as increasing the surface viscosity of the interface which makes it more resistant to deformation.

The alkyl polyglucoside derivative surfactants can be used to boost the stability of foams produced by surfactants which are not tolerant or compatible in high electrolyte containing brines, e.g. anionic surfactants such as alpha olefin sulfonates or alcohol ethoxylates.

There is a technical benefit to using a combination of alkyl polyglucoside derivatives (such as lauryl glucoside betaine crosspolymer or disodium sulfosuccinate lauryl glucoside crosspolymer) in combination with amphoteric surfactants (such as lauramidopropyl hydroxysultaine, disodium laurampho(di)acetate, and lauramidopropyl betaine). This is evidenced in terms of the foam obtained having increased dynamic stability. The foam obtained is more resistant to deformation.

It will be appreciated by those skilled in the art that the foregoing is a description of a preferred embodiment of the present invention and that variations in design and construction may be made to the preferred embodiment without departing from the scope of the invention as defined by the appended claims.

The invention claimed is:

1. A method of unloading liquid from a hydrocarbon reservoir, the method comprising: introducing two surfactants into the liquid, in order to foam the liquid; and then removing foamed liquid from the reservoir;
   wherein the first surfactant comprises an alkyl polyglucoside derivative selected from the group consisting of:
   Sodium hydroxypropyl sulfonate decyl glucose crosspolymer,
   Sodium hydroxypropyl sulfonate lauryl glucose crosspolymer,
   Disodium sulfosuccinate decyl glucoside crosspolymer,
   Disodium sulfosuccinate lauryl glucoside crosspolymer,
   Sodium succinate lauryl glucoside crosspolymer,
   Poly sodium decyl glucoside hydroxypropyl phosphate,
   Poly sodium lauryl glucoside hydroxypropyl phosphate,
   Coco glucoside betaine crosspolymer,
   Lauryl glucoside betaine crosspolymer,
   Hydroxypropyltrimonium coco glucosides chloride, and
   Stearvidimonium hydroxypropyl lauryl glucosides chloride, and the second surfactant is selected from the group consisting of:
   Lauramidopropyl hydroxysultaine,
   Cocamidopropyl hydroxysultaine,
   Lauramidopropyl betaine,
   Disodium lauramphodiacetate, and
   Disodium lauraminodipropionate.

2. The method of claim 1, wherein the surfactants are used in the reservoir at a total active surfactant concentration of:
   (a) 100ppm or more; or
   (b) 150ppm or more; or
   (c) 250ppm or more; or
   (d) 500ppm or more; or
   (e) from 250ppm to 10,000ppm; or
   (f) from 500ppm to 5,000ppm.

3. The method according to claim 1 wherein the ratio of the first surfactant to the second surfactant by weight is:
   (a) from about 5:1 to about 1:5, or
   (b) from about 4:1 to about 1:4, or
   (c) from about 3:1 to about 1:3.

4. A method of unloading a liquid from a reservoir comprising the step of using a surfactant composition to generate a foam, wherein the composition comprises: a first surfactant which comprises an alkyl polyglucoside derivative selected from the group consisting of:
   Sodium hydroxypropyl sulfonate decvtglucose crosspolymer,
   Sodium hydroxypropyl sulfonate lauryl glucose crosspolymer,
   Disodium sulfosuccinate decyl glucoside crosspolymer,
   Disodium sulfosuccinate lauryl glucoside crosspolymer,
   Sodium succinate lauryl glucoside crosspolymer,
   Poly sodium decyl glucoside hydroxypropyl phosphate,
   Poly sodium lauryl glucoside hydroxypropyl phosphate,
   Coco glucoside betaine crosspolymer, Lauryl glucoside betaine crosspolymer,
Hydroxypropyltrimonium coco glucosides chloride, and
Stearylidimonium hydroxypropyl lauryl glucosides chloride; and a second surfactant which is selected from the group consisting of
Lauramidopropyl hydroxysultaine,
Cocamidopropyl hydroxysultaine,
Lauramidopropyl betaine,
Disodium lauramphodiacetate, and
Disodium lauraminodipropionate.

5. A method of synergistically enhanced liquid unloading from a reservoir comprising a step of using two surfactants in combination, wherein the first surfactant comprises an alkyl polyglucoside derivative selected from the group consisting of:
 Sodium hydroxypropyl sulfonate decyl glucose crosspolymer,
 Sodium hydroxypropyl sulfonate lauryl glucose crosspolymer,
 Disodium sulfosuccinate decyl glucoside crosspolymer,
 Disodium sulfosuccinate lauryl glucoside crosspolymer,
 Sodium succinate lauryl glucoside crosspolymer,
 Poly sodium decyl glucoside hydroxypropyl phosphate,
 Poly sodium lauryl glucoside hydroxypropyl phosphate,
 Coco glucoside betaine crosspolymer,
 Lauryl glycoside betaine crosspolymer,
 Hydroxypropyltrimonium coco glucosides chloride,and
 Stearyldimonium hydroxypropyl lauryl glucosides chloride; and the second surfactant is selected from the group consisting of
 Lauramidopropyl hydroxysultaine,
 Cocamidopropyl hydroxysultaine,
 Lauramidopropyl betaine,
 Disodium lauramphodiacetate, and
 Disodium lauraminodipropionate.

6. The method of claim 5, wherein the reservoir is a hydrocarbon reservoir.

* * * * *